United States Patent [19]

Ikeda et al.

[11] 4,133,759
[45] Jan. 9, 1979

[54] LIQUID PURIFICATION APPARATUS

[75] Inventors: Yorifumi Ikeda, Suita; Kikuo Nishikawa, Neyagawa, both of Japan

[73] Assignee: Takeda Chemical Industries, Ltd., Osaka, Japan

[21] Appl. No.: 719,386

[22] Filed: Aug. 31, 1976

[30] Foreign Application Priority Data

Nov. 3, 1975 [JP] Japan .............................. 50-131954
Apr. 8, 1976 [JP] Japan .............................. 51-40622

[51] Int. Cl.$^2$ .......................................... B01D 15/06
[52] U.S. Cl. ................................. 210/104; 210/138; 210/268
[58] Field of Search .............. 210/104, 112, 138, 268

[56] References Cited

U.S. PATENT DOCUMENTS

| | | | |
|---|---|---|---|
| 2,850,438 | 9/1958 | Bodkin et al. | 210/268 X |
| 2,882,912 | 4/1959 | Reeg et al. | 210/268 X |
| 3,512,640 | 5/1970 | Hellmann | 210/104 X |
| 4,033,874 | 7/1977 | Marquard et al. | 210/268 X |

*Primary Examiner*—John Adee
*Attorney, Agent, or Firm*—Wenderoth, Lind & Ponack

[57] ABSTRACT

A liquid purification apparatus which comprises a hollow cylindrical column having a liquid rectifier and collector positioned respectively adjacent the bottom and top of the column in communication with liquid inlet and outlet. A mass of adsorbent material is accommodated within the column in such an amount that a portion of the material within the column and above the liquid collector forms a settling layer to avoid any possible fluidization and/or expansion of another portion of the material situated between the liquid rectifier and collector. The column has a material inlet at the top thereof through which material is continuously supplied into the column while a portion of the material adjacent the bottom of the column is exhausted to the outside through an outlet at the bottom of the column. The uppermost surface level of the material within the column is maintained within a predetermined range.

13 Claims, 8 Drawing Figures

LIQUID PURIFICATION APPARATUS

The present invention generally relates to a liquid purification apparatus and, more particularly, to a continuous liquid purification apparatus for substantially purifying liquid by flowing the latter upwardly through a downwardly moving bed of adsorbent material.

A liquid purification apparatus for a counterflow system utilizing a moving bed of adsorbent material is well known. This conventional apparatus intended, not exclusively though it may be, for substantially purifying industrial waste water comprises a vertical column of, for example, 200 mm. in inner diameter and 1,000 mm. in height which is completely filled with adsorbent material, such as anthracite of, for example, 0.58 mm. in particle size. The vertical column has a supply hopper mounted on and held in communication through a check valve with the top of the column. This supply hopper is in turn communicated to an adsorbent washing unit so designed as to wash the spent adsorbent material supplied thereto from the bottom of the column through a first switching valve, then through a drain container and finally through a weighing hopper. Waste water or sewage to be treated to provde substantially purified water is introduced into the column through a primary inlet adjacent the bottom of the column and is ejected through an outlet adjacent the top of the column. The water within the column flows upwards through the bed of adsorbent material from the primary inlet towards the outlet. The column has an auxiliary inlet positioned above the primary inlet and is communicated to a source of waste water through a second switching valve. The primary inlet is also communicated to the same source of waste water through a third switching valve arranged in parallel to the second switching valve. While the third switching valve is of such a design as to allow the waste water introduced into the column through the primary inlet to flow upwards through the bed of adsorbent material at a predetermined linear velocity, for example, 20 m/hr., the second switching valve is of such a design that the waste water when introduced into the column through the auxiliary inlet will not flow upwards.

These first to third switching valves used in the conventional liquid purification apparatus are so associated with each other as to operate in a predetermined sequence controlled by a cycle timer. More specifically, during a predetermined period of time, for example, 30 minutes, water purification proceeds while the waste water is introduced into the column through the primary inlet with the third switching valve opened. After the predetermined period of time, the third switching valve closes while the first and second switching valves are opened for a predetermined period of time, for example, 15 seconds. During the opening of the first and second switching valves, a portion of the adsorbent bed within the column, which is situated below the level of the auxiliary inlet, is exhausted from the bottom of the column through the first switching valve to the drain container by the aid of the waste water, which is then introduced into the column through the second switching valve by way of the auxiliary inlet, while the remaining portion of the adsorbent bed falls by gravity towards the bottom of the column. When that portion of the absorbent bed below the level of the auxiliary inlet is so exhausted onto the drain container, a mass of adsorbent material within the supply hopper is supplied into the column through the check valve to fill up the column again, on one hand, and another mass of adsorbent material, which has previously been stored in the drain container, is transferred onto the washing unit through the weighing hopper, on the other hand.

The conventional liquid purification apparatus of the above described construction is disclosed in the Japanese Patent Publication (Examined) No. 7615, published on Apr. 10, 1969, and appears to be satisfactory. However, in view of the fact that the vertical column is completely filled with the adsorbent material and since it is very difficult to determine the extent to which the vertical column is replenished with the adsorbent material supplied from the supply hopper, one or more weighing devices, including the weighing hopper, are essentially required. In practice, weighing of the adsorbent material during its recycle from the bottom to the top of the column is carried out at a plurality of locations on the system; that is, when the adsorbent material is accommodated within the drain container, when the same is accommodated within the weighing hopper and when the same is accommodated within the supply hopper. This is because the weight of the spent adsorbent material exhausted from the column is, even though the water content has completely been drained, different from, that is, greater than, that of the washed adsorbent material ready to enter the column.

If the weighing is not accurate, there is the possibility that the check valve will clog, since water within the supply hopper tends to leak from the outlet in the column, or, in the presence of an empty space within and at the top of the column, the adsorbent bed is likely to be undesirably fluidized.

In any event, this conventional liquid purification apparatus requires complicated and time-consuming operating procedures and is bulky in construction.

Accordingly, the present invention has for its object to provide a continuous liquid purification apparatus which substantially eliminates the disadvantages and inconveniences inherent in the conventional apparatus of similar kind.

According to the present invention, there is disclosed a continuous liquid purification apparatus which comprises a vertical column having an inlet, positioned adjacent the bottom of the column and held in communication with a source of waste water or other liquid through a pump, and an outlet positioned adjacent the top of the column. Within the vertical column, there is accommodated a rectifier in communication with the inlet and a collector in communication with the outlet. A mass of adsorbent material, preferably, activated carbon, is also accommodated within the vertical column, thus forming a bed of adsorbent material.

As an essential feature of the present invention, the amount of the material within the vertical column or the height of the bed within the vertical column is so selected as to allow a portion of the bed to form a settling layer of predetermined thickness above the collector without filling up the interior of the vertical column. The uppermost level of the settling layer of material remote from the collector elevates and, therefore, the thickness of the settling layer increases during continuous supply of the material from the top of the vertical column.

When the uppermost level of the settling layer, that is, the uppermost level of the bed within the column, exceeds a predetermined upper limit, an exhaust valve operatively coupled to the bottom of the column opens to exhaust a portion of the material, which has been situated adjacent the bottom of the column. The exhaust valve is automatically closed when that portion of the material so exhausted amounts to such a value that the uppermost level of the bed descends below a predetermined lower limit, which predetermined lower limit is located above the level of the collector.

The settling layer of material, which is a portion of the bed situated above the level of the collector, plays such an important role as to avoid any possible fluidization and/or expansion of the remaining portion of the bed. It is to be noted that, if the bed is allowed to expand and/or fluidize in contact with water flowing upwards therethrough within a vertical column, undesirable classification of adsorbent material and/or channeling of either adsorbent material or liquid are likely to occur.

In any event, these and other objects and features of the present invention will become apparent from the following description taken in conjunction with preferred embodiments thereof with reference to the accompanying drawings, in which.

Before the description of the present invention proceeds, it it to be noted that like parts are designated by like reference numerals throughout the accompanying drawings.

Figure 1:
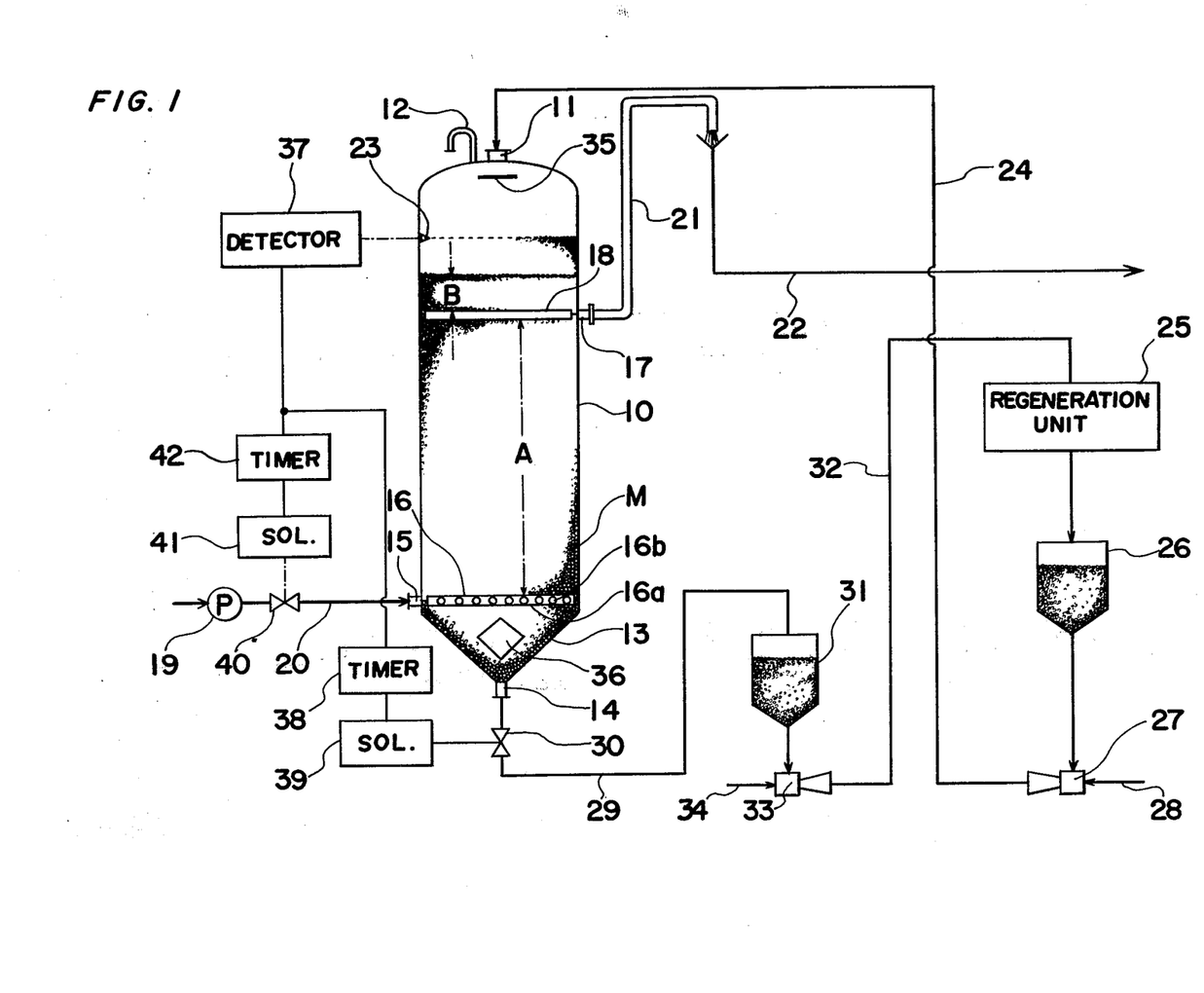
FIG. 1 is a schematic flow chart of a liquid purification apparatus according to one embodiment of the present invention.

Referring first to FIG. 1, there is illustrated a hollow cylindrical column 10 accommodating therein a predetermined amount of adsorbent material M and having an adsorbent inlet 11 and a vent pipe 12, both on its top and held in communication with the interior of the column 10. The bottom of the column 10 is of substantially inverted conical shape and, for this purpose, is downwardly tapered at 13, terminating at an adsorbent material outlet 14 which is also in communication with the interior of the column 10.

The column 10 also has a liquid inlet 15 in communication with the interior of the column 10 through a rectifier 16 of a construction as will be described later and a liquid outlet 17 in communication with the interior of the column 10 through a liquid collector 18 of a construction as will be described later. A source (not shown) of waste water or other liquid to be treated is communicated to the liquid inlet 15 through a pump 19 by way of piping 20. The waste water from the source introduced into the column 10 can, therefore, be uniformly upwardly distributed by the rectifier 16. The liquid outlet 17 is in communication with a duct 21 having one end coupled to the liquid outlet 17 and the other end coupled through a siphon breaker to an aqueduct 22 through which substantially purified liquid is exhausted; the function of the duct 21 will become apparent from the subsequent description.

Figure 2:
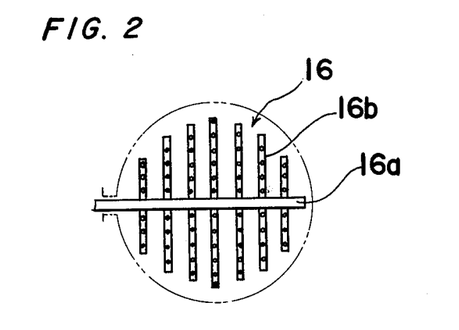
FIG. 2 is a schematic top plan view of a rectifier employed in the apparatus shown in FIG. 1.

As best shown in FIG. 2, the rectifier 16 is constituted by a mainstream pipe 16a, having one end closed and the other end coupled to the piping 20 through the liquid inlet 15, and a plurality of pairs of perforated distributor pipes 16b laterally extending from the mainstream pipe 16a in opposite directions at right angles to said pipe 16a, respectively. However, the construction of the rectifier 16 may not be limited to that shown in FIG. 1, but may be of any other construction if it serves the purpose, that is, distributes the introduced waste water so as to flow upwardly and uniformly through the material M forming the bed within the column 10.

Figure 3:
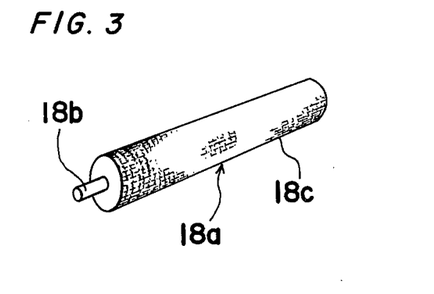
FIG. 3 is a schematic perspective view of one of strainers forming a water collector employed in the apparatus shown in FIG. 1.
Figure 4:
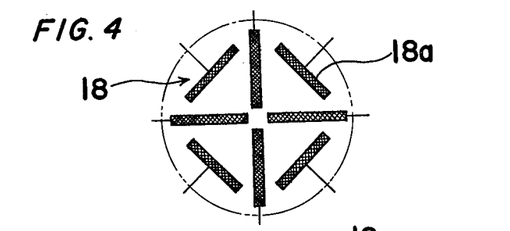
FIG. 4 is a schematic top plan view of the water collector, showing an arrangement of the strainers shown in FIG. 3.

The liquid collector 18 is a plurality of cylindrical strainers 18a arranged in a manner as shown in FIG. 4. As best shown in FIG. 3, each of the strainers 18a is a pipe 18b having one end coupled to the duct 21 through the liquid outlet 17 with the other end held in communication with the interior of the column 10 through a cylindrical body 18c made of, for example, stainless steel wire mesh having openings smaller than the average particle size of the material M used.

Referring back to FIG. 1, the column 10 has a level sensor 23 for detecting the position of the uppermost surface level of the material M within the column, which level sensor 23 is positioned substantially intermediately between the top of the column 10 and the liquid collector 18. As will become clear from the subsequent description, the position of the level sensor 23 defines the uppermost limit for the uppermost surface level of the bed.

The vertical column 10 is constructed as hereinbefore described, and a supply pipe 24 extending from a source of a slurry of the adsorbent material is connected to the adsorbent inlet 11. The source of the slurry of adsorbent material is shown as being comprised of a regenerating unit 25 which is connected to said supply pipe 24 through a storage hopper 26 and then an ejector 27, the ejector 27 being so designed as to draw the material within the storage hopper 26 onto a stream of water flowing therethrough from a source of water by way of a pipe 28. The regenerating unit 25 and the ejector 27 are of any known construction and, therefore, the details thereof are herein omitted.

The regenerating unit 25 receives the adsorbent material exhausted from the column 10, in a manner as will be described later, through the outlet 14. For this purpose, an exhaust piping 29 having a solenoid operated control valve 30 disposed thereon extends from the outlet 14 to a relay hopper 31 which is in turn connected to the regenerating unit 25 through a transport piping 32 by way of an ejector 33. The ejector 33 functions in a manner similar to the ejector 27 such that the material within the relay hopper 31 is drawn onto a stream of water flowing therethrough by way of a pipe 34 from a source of water which may be the same as the water source from which the pipe 28 extends.

The initial amount of the material M accommodated within the column 10 is selected so that, while an area within the column 10 and below the level of the liquid collector 18 is completely filled with material M, a settling layer of the same material M can be formed above the level of the liquid collector 18 and below the uppermost limit defined by the level sensor 23. This settling layer serves to avoid any possible fluidization and/or expansion of the material situated below the level of the liquid collector 18, which fluidization and/or expansion may otherwise occur during upflow of the liquid from the rectifier 16 towards the collector 18. In the present invention, such fluidization and expansion must be avoided because they constitute a cause for reduction in purification efficiency.

Since a slurry of the material M from the source thereof is, according to the present invention, continuously supplied into the column 10 through the inlet 11, the thickness of the settling layer, as indicated by B varies with the elevation of the uppermost surface level of the material M within the column 10. Moreover, the minimum thickness B of the settling layer required to avoid the possible fluidization and/or expansion of the material M below the level of the collector 18 varies depending upon the linear velocity of the waste liquid through the bed, the type of the material M used, and/or the thickness or height A of a layer of the material defined between the rectifier 16 and the collector 18.

However, a series of experiments conducted by the inventors using activated carbon, sold under the brand name of "TAKEDA X-7000" by the assignee of the present invention, having an average particle size of 1.4 mm. and a specific gravity of 1.32 when impregnated with water, have shown that an approximate value of the minimum thickness B of the settling layer can be calculated from the following experimental formula:

$$B \approx (2 \times 10)^{-2} \times A \times (v/v_f - 1)$$

wherein v represents the linear velocity of the upflow of the waste liquid within the column 10 and $v_f$ represents the minimum fluidizing velocity at which particles of the material M start to fluidize within the column 10.

By the application of the foregoing experimental formula, the following results as tabulated have been given.

| Velocity v (m/hr.) | Height A (m.) | Thickness B (m.) |
| --- | --- | --- |
| 10 | 3 | 0 |
| 10 | 6 | 0 |
| 20 | 3 | 0.06 |
| 20 | 6 | 0.12 |
| 30 | 3 | 0.12 |
| 30 | 6 | 0.24 |

From the foregoing table, it is clear that the minimum thickness B of the settling layer of the material m is a few percents of the height A of the layer between the rectifier 16 and the collector 18 when the upflow linear velocity v of 10 to 20 m/hr., which is generally considered appropriate value in liquid purification by the effect of adsorption, is taken into consideration.

As described above, the material m is continuously supplied into the column 10 through the inlet 11. In order to avoid any possible formation of a lump on the uppermost surface of the material within the column 10 during the continuous supply thereof bent material through the inlet 11, a distributor 35 is positioned within the column 10 and is immediately below the inlet 11 for uniformly distributing particles of the material m so supplied onto the uppermost surface of the material m within the column 10.

Similarly, for facilitating a smooth flow of material particles at the bottom of the column 10 towards the outlet 14, another distributor 36 substantially the shape of two cones whose bases are butted together is positioned within the column 10 below the rectifier 16 and immediately above the outlet 14.

The level sensor 23 is operatively associated with the solenoid operated control valve 30 in the following manner. As the uppermost surface level of the material bed within the column 10 exceeds the upper limit defined by the level sensor 23, the level sensor 23 generates an electric signal to a detector 37 which in turn operates a timer 38. Upon operation of the timer 38, the latter continues to keep a solenoid circuit 39 for the valve 30 energized for a predetermined period of time set to said timer 38. During energization of the solenoid circuit 39, the solenoid operated control valve 30 is opened to allow a portion of the adsorbent material M adjacent the bottom of the column 10 to flow in the form of a slurry through the valve 30 toward the relay hopper 31 by way of the exhaust piping 29. As that portion of the material adjacent the bottom of the column 10 is so exhausted, the uppermost surface level of the material M within the column 10, which has exceeded the uppermost limit defined by the level sensor 23, descends to assume the initial surface level of the material, with consequent downward movement of the bed within the column 10. The timer 38 is employed to determine the amount of the material to be exhausted through the exhaust outlet 14 and, accordingly, the predetermined period of time set to the timer 38 is selected so that the amount of spent material exhausted can be equalized to the increment of material resulting from the continuous supply thereof into the column 10.

After a predetermined period of time during which the solenoid circuit 39 is energized has elapsed, the control valve 30 is closed until the uppermost surface level of the material within the column subsequently exceeds the uppermost limit.

The spent material exhausted to the sweeping-off tank 31 is then transported through the ejector 33 by means of the transport piping 32 towards the regenerating unit 25 and, after having been regenerated, towards the storage hopper 26. From the storage hopper 26, the adsorbent material so regenerated is fed through the ejector 27 toward the inlet 11. The continuous supply of the material into the column 10 through the inlet 11 is possible because one or both of the hoppers 31 and 26 contains an additional amount of material separate from the adsorbent material initially charged into the column 10.

It is to be noted that continued pumping of the liquid into the column 10 so as to flow upwardly through the bed of material M at a predetermined linear velocity, for example, within the range of 10 to 30 m/hr., irrespective of the closure and opening of the control valve 30, is undesirable because of the possibility that, during opening of the valve 30, the material M within the column 10 may be fluidized. In order to avoid this, a solenoid operated flow regulating valve 40 having a solenoid circuit 41 is disposed on the supply piping 20. This solenoid circuit 41 can be energized by the operation of a timer 42 for a predetermined period of time set on said timer 42 and for a greater than the predetermined period of time set on the timer 38 by, for example, 30 seconds. It is clear that the timer 42 is operated simultaneously with the timer 38 to energize the solenoid circuit 41 for the valve 40 and, during energization of the solenoid circuit 41, the flow regulating valve 40 is operated to reduce the rate of flow of the liquid through the supply piping 20 so that the linear velocity of the liquid through the bed within the column 10 can become lower than the minimum fluidizing velocity at which the bed particles start to fluidize. The flow regulating valve 40 returns to its initial, open position a predetermined time after complete closure of the control valve 30, which predetermined time is substantially equal to the difference between the predetermined periods of time respectively set to the timers 38 and 42.

The liquid thus substantially purified during its passage through the bed and, particularly, a portion of the material between the rectifier 16 and the collector 18, is collected by the collector 18 and is subsequently ejected onto the aqueduct 22 through the duct 21. The duct 21 extends from the liquid outlet 17 upwardly from the column 10 and opens towards the aqueduct 22 at a position above the level of the top of the column 10 for avoiding any possible outflow of a portion of water above the collector 18 under the influence of the water head.

The adsorbent materials used in the present invention may be any filtering material such as sand, anthracite, glass and porcelain or an adsorbent material such as, activated carbon, activated alumina, silica gel, and synthetic zeolite, or an ion exchange resin.

In the foregoing embodiment, it has been described that the amount of the material exhausted through the outlet 14 is determined by the timer 38 which operates to energize the solenoid circuit 39 for the control valve 30 for the predetermined period of time set to said timer 38. However, in the example shown in FIG. 5, the timer 38 is omitted together with the timer 42 and, instead, an additional level sensor which defines the lowermost limit for the uppermost surface level of the adsorbent material M within the column 10 is employed.

Figure 5:
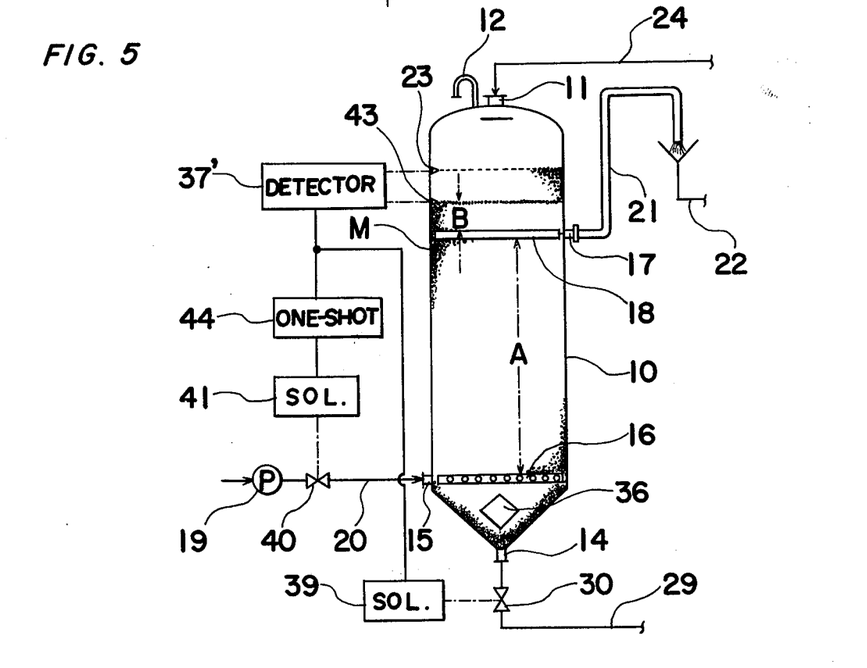
FIG. 5 is a diagram similar to a portion of FIG. 1, showing another embodiment of the present invention.

Referring to FIG. 5, the additional level sensor 43 is positioned within the column 10 below the level sensor 23 and above the liquid collector 18; the distance between the level of the additional level sensor 43 and the level of the liquid collector 18 is substantially equal to or slightly greater than the minimum thickness B of the settling layer.

On the other hand, the detector 37' is designed to generate a trigger pulse in response to an electric signal from the level sensor 23 and to cease the generation of the trigger pulse in response to an electrical signal from the level sensor 43, the electrical signal from the level sensor 23 being indicative of an increase in the uppermost surface level of the material M within the column 10 above the uppermost limit and the electrical signal from the level sensor 43 being indicative of a decrease in the uppermost surface level of the material within the column 10 below the lowermost limit. It will, therefore, readily be seen that the trigger pulse generated from the detector 37' has a pulse duration substantially equal to the time span between generation of the electrical signal from the level sensor 23 and generation of the electrical signal from the additional level sensor 43.

The trigger pulse from the detector 37' is applied in part to the solenoid circuit 39 for the control valve 30 and in part to the solenod circuit 41 for the flow regulating valve 40 through a one-shot multivibrator 44, the latter being necessitated to prolong the pulse duration of the trigger pulse for a predetermined time, for example, 30 seconds.

From the foregoing description, it is clear that the solenoid operated control valve 30 can be opened only when the uppermost surface level of the material within the column 10 exceeds the uppermost limit and can be closed only when the same falls below the lowermost limit. The amount of the material exhausted through the outlet 14 during the opening of the control valve 30 is determined by the spacing between the level sensors 23 and 43.

Figure 6:
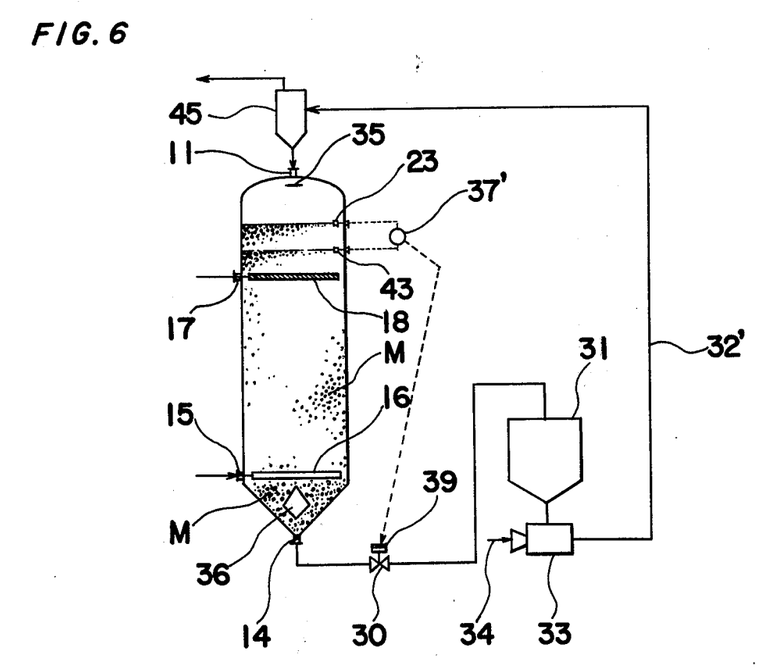
FIG. 6 is a diagram similar to FIG. 1, showing a further embodiment of the present invention.

In any of the foregoing embodiments of FIGS. 1 and 5, the source of the material from which the latter is continuously supplied into the column 10 through the inlet 11 has been described as comprising the regenerating unit 25. However, the source of the material M may comprise a cyclone separator 45 of any known construction to which the exhausted material from the outlet 14 is fed through the storage hopper 31, then through the ejector 33 and finally through the transport piping 32', such as shown in FIG. 6. It is to be noted that, during transportation of the exhausted material in the form of a slurry through the transport piping 32', impurities or waste matter, for example, suspension solids, adsorbed by and, consequently, adhering to the bed particles can advantageously be separated from the particles because of a rapid stream of fluid present within the transport piping 32'. Therefore, the impurities or waste matter can readily be separated by the cyclone separator 45 from the particles.

It is to be noted that, so far as the electric circuitry employed in the system of FIG. 6 is concerned, the additional level sensor 43 may be omitted.

Figure 7:
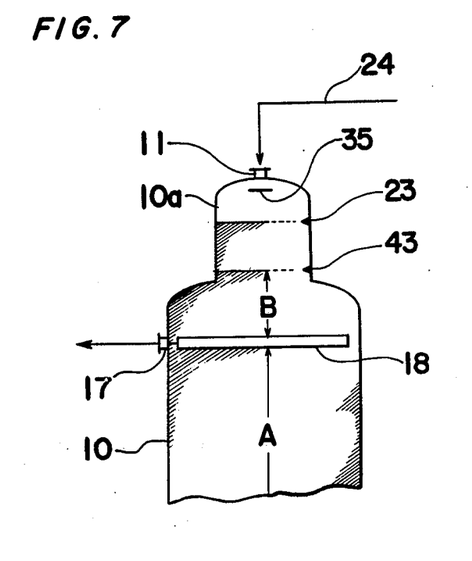
FIG. 7 is a schematic sectional view of a top portion of a vertical column, showing a modification of the vertical column shown in any of FIGS. 1, 5 and 6.

Referring to FIG. 7, the column 10 is shown to have a reduced diameter portion 10a adjacent the top thereof and above the liquid collector 18. This is particularly advantageous in that a relatively great spacing can be available between the level sensors 23 and 43 and is advantageously applicable where the amount of the material exhausted through the outlet 14 is relatively small.

It is to be noted that, even though the column 10 is shaped such as shown in FIG. 7, the additional level sensor 43 may be omitted where the electric circuitry shown in FIG. 1 is employed.

Figure 8:
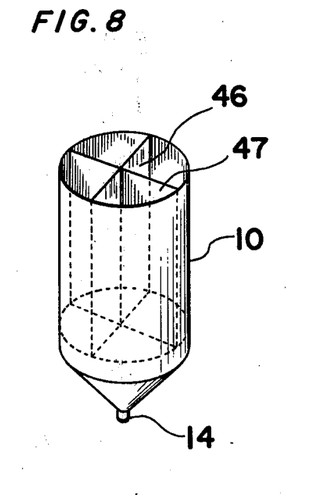
FIG. 8 is a schematic perspective view showing a modified version of the vertical column which may be employed in the vertical column according to the present invention, with a top portion of the vertical column of FIG. 8 being omitted to show the interior of the column.

The column 10 may have one or more rectifying plate members positioned within the column between the liquid rectifier 16 and the liquid collector 18, such as shown in FIG. 8, for facilitating a smooth and uniform movement of the bed within the column 10.

In FIG. 8, there are illustrated two rectifying plate members 46 and 47 joined together to assume a cross shape in section. These plate members 46 and 47 are fixedly accommodated within the column 10 and extend between the liquid collector 18 and the liquid rectifier 16, thereby dividing the portion of the material M between the liquid collector 18 and the liquid rectifier 16 into four sections which simultaneously downwardly move during the exhaust of the portion of the material adjacent the bottom of the column 10.

From the foregoing full description of the present invention, it has now become clear that substantial liquid purification can efficiently and effectively be carried out without the introduction of waste water or other liquid to be purified into the column being interrupted even during the exhaust of that portion of the material adjacent the bottom of the column. Moreover, by the continuous supply of the material into the column, the settling layer of material always exists above the liquid collector and functions to settle that portion of the material between the liquid rectifier and the liquid collector so that fluidization and/or expansion will not occur in the bed.

Although the present invention has fully been described in conjunction with the preferred embodiments thereof with reference to the accompanying drawings, it is to be noted that various changes and modifications are apparent to those skilled in the art. By way of example, instead of the employment of the ejectors 27 and 33, slurry pumps may be employed. In addition, a constant quantity regulator may be disposed on a piping between the hopper 26 and the ejector 27 for adjusting to a predetermined value the amount of adsorbent material to be supplied from the hopper 26 onto the ejector, in which case the constant quantity regulator may be constituted by a rotary valve, a hand-operated valve or a double-staged damper.

Furthermore, in any of the foregoing embodiments each of the valves 30 and 40 has been described as a solenoid-operated type. However, it is possible to install a pneumatically or hydraulically operated valve on the piping 29 or 20. In this case, it is necessary to install the valve 30 or 40 on a piping having one end coupled to the pneumatically or hydraulically operated valve and the other end coupled to a source of compressed air or a fluid medium.

Therefore, such changes and modifications are to be construed as included within the true scope of the present invention unless they depart therefrom.

What is claimed is:

1. A liquid purification apparatus for purifying a liquid, said apparatus comprising:
    a adsorbent material supply means for continuously supplying adsorbent material to purify said liquid;
    a hollow column connected to said supply means and containing a mass of said adsorbent material therein, said column having a adsorbent material inlet and an adsorbent material outlet spaced from each other at the top and bottom, respectively, of said column, said inlet being connected to said supply means for receiving said adsorbent material from said supply means into said column and said outlet discharging said material from the bottom of said column;
    a liquid supply means for continuously supplying said liquid to be purified to said column;
    a liquid rectifier means within said column at the lower portion thereof and connected to said liquid supply means for dispersing said liquid in a uniform upwardly directed flow within said column;
    a liquid collector means within said column at a predetermined position above said rectifier means for removing the liquid flowing upward from said rectifier means through said material from said column;
    said rectifier and collector means being completely emdedded within said mass of adsorbent material inside said column;
    said means of adsorbent material above said collector means forming a settling layer, said settling layer being variable in thickness within said column;
    valve means positioned at the adsorbent material outlet from said column for regulating the flow of adsorbent material in said column outward through said outlet;
    control means connected to said valve means for controlling the opening and closing of said valve means for predetermined periods of time in relation of the elevation of the uppermost level of said adsorbent material continuously supplied to said column, said predetermined period of time during which said valve means is opened corresponding to the time span between the time when the uppermost surface level of said adsorbent material exceeds a predetermined upper limit in said column and the time when the uppermost surface returns to its initial lowermost limit spaced from said liquid collector means by a distance approximately at least equal to the required minimum thickness of said settling layer; and
    liquid level control means in said column for maintaining the uppermost level of said liquid being purified in said column above the uppermost surface of said adsorbent material.

2. A liquid purification apparatus for purifying a liquid, said apparatus comprising:
    an adsorbent material supply means for continuously supplying an adsorbent material to purify said liquid;
    a hollow column connected to said supply means and containing a mass of said adsorbent material therein, said column having an adsorbent material inlet and an adsorbent material outlet spaced from each other at the top and bottom, respectively, of said column, both said inlet and outlet being connected to said supply means, said inlet receiving said adsorbent material from said supply means and said outlet returning said material from said column to said supply means;
    a liquid supply means for continuously supplying said liquid to be purified to said column;
    a liquid rectifier means within said column at the lower portion thereof and connected to said liquid supply means for dispersing said liquid in a uniform upwardly directed flow within said column;
    a liquid collector means within said column at a predetermined position above said rectifier means for removing the liquid flowing upward from said rectifier means through said material from said column;
    said rectifier and collector means being completely emdedded within said mass of adsorbent material inside said column;
    said mass of adsorbent material within said column forming a bed with a height less than the height of the inside of said column and said bed forming a settling layer above said liquid collector means and the uppermost surface of said bed, said settling layer preventing fluidization and expansion of said adsorbent material therebeneath, and said settling layer varying in depth during the continuous purification of said liquid in said column;
    valve means positioned at the adsorbent material outlet from said column for regulating the flow of adsorbent material in said column outward through said outlet;
    adjustment means in said liquid supply means for adjusting the rate of liquid supplied to said rectifier means during the period when said valve means is open and said adsorbent material is withdrawn from said column therethrough, said liquid supply rate being maintained at a level so as to prevent said fluid flowing upward through said bed from fluidizing said adsorbent material in said bed;
    liquid level control means in said column for maintaining the uppermost level of said liquid being purified in said column above the uppermost surface of said adsorbent material; and control means between the top of said column and said valve means for controlling the opening and closing of said valve means for predetermined periods of time in relation to the elevation of the uppermost level of adsorbent material continuously supplied to said column through said inlet, said predetermined period of time during which said valve means is opened corresponding to the time span between the time when the depth of said settling layer exceeds a predetermined maximum value and the time when said settling layer returns to its initial lowermost depth as a result of discharging said adsorbent material through said outlet.

3. An apparatus as claimed in claim 2, wherein said adsorbent material supply means is comprised of:
   an exhaust pipe connected to said material outlet of said column;
   an inlet pipe connected to said material inlet; and;
   a regenerating means positioned between and connecting said exhaust and inlet pipes of said column for regenerating said adsorbent material withdrawn through said outlet and exhaust pipe before it is returned to said inlet pipe and inlet.

4. An apparatus as claimed in claim 2, wherein:
   said valve means is comprised of a solenoid-operated valve including a solenoid circuit, said solenoid-operated valve being opened during energization of said solenoid circuit; and
   wherein said control means is comprised of a detector circuit including a level sensor is positioned within the column at the position of the maximum thickness of said settling layer, and timer means connected between said detector circuit and said solenoid circuit for energizing said solenoid circuit for said predetermined period of time in response to the application of an electrical signal from the detector circuit thereto indicating the elevation of the thickness of the settling layer over a maximum value, said solenoid-operated valve automatically closing after the predetermined period of time set by the timer has elapsed.

5. An apparatus as claimed in claim 4, wherein:
   said adjustment means is comprised of a solenoid-operated flow regulating valve connected to said liquid supply means before said liquid rectifier and being operable in response to an electrical signal from said detector circuit to thereby reduce the rate of flow of said liquid to said liquid rectifier.

6. An apparatus as claimed in claim 2, wherein:
   said valve means is comprised of a solenoid-operated valve including a solenoid circuit, said solenoid operated valve being opened during energization of the solenoid circuit; and
   wherein said control means is comprised of a detector circuit, including an upper level sensor positioned within said column and defining the position of the maximum thickness of said settling layer and a lower level sensor positioned within said column and defining a position upwardly spaced a predetermined distance from the position of the required minimum thickness of said settling layer, said upper level sensor generating an electric signal to said detector circuit only when the thickness of said settling layer exceeds the maximum value, said lower level sensor generating an electric signal to said detector circuit just when the thickness of said settling layer falls below the position of said lower level sensor, said detector circuit generating a trigger pulse to said solenoid circuit to energize the latter during the time span between generation of said electrical signal from the upper level sensor and generation of the electrical signal from the lower level sensor.

7. An apparatus as claimed in claim 6, wherein said adjustment means is comprised of a solenoid-operated flow regulating valve connected to said liquid supply means before said liquid rectifier and being operable in respone to an electrical signal from said detector circuit to thereby reduce the rate of flow of said liquid to said liquid rectifier.

8. An apparatus as claimed in claim 2, wherein said adsorbent material supplied by said adsorbent material supply means is activated carbon.

9. An apparatus as claimed in claim 2, further comprising communication means at the top portion of said column for communicating the space between the top of said column and the uppermost surface level of the liquid within said column with the atmosphere externally of the column.

10. An apparatus as claimed in claim 2, wherein said valve means is a pneumatically-operated valve.

11. An apparatus as claimed in claim 2, wherein said valve means is an hydraulically-operated valve.

12. An apparatus as claimed in claim 2, wherein said adsorbent material supplied by said adsorbent material supply means is selected from the group consisting essentially of, anthracite, glass, activated carbon, activated alumina, silica gel, synthetic zeolite, and ion exchange resins.

13. A liquid purification apparatus for purifying a liquid, said apparatus comprising:
   an adsorbent material supply means for continuously supplying an adsorbent material to purify said liquid;
   a hollow column connected to said adsorbent material supply means and containing a mass of said adsorbent material therein, said column having;
      a material inlet and an outlet spaced from each other at the top and bottom of the column, respectively, said material inlet and outlet being connected to said adsorbent material supply means, and
      a liquid inlet and a liquid outlet in spaced relation to each other at respective positions adjacent the bottom and top of the column;
   liquid supply means connected to said liquid inlet for continuously supplying said liquid into said column through the liquid inlet;
   control valve means at said material outlet for controlling the discharge of said adsorbent material through the material outlet into said adsorbent material supply means;
   liquid rectifier means positioned within the column in communication with the liquid inlet for causing said liquid introduced through the liquid inlet to flow uniformly upward through said material within the column at a predetermined velocity;
   liquid collector means positioned within the column in communication with said liquid outlet for collecting the liquid which has been passed through said material and discharging it to the outside of the column through the liquid outlet;
   said liquid rectifier and collector being completely embedded in said adsorbent material within said column and the amount of said material within the column being selected so that the height of a bed of said material within said column is smaller than the interior height of said column and so that a portion of said bed between the uppermost surface level thereof and the level of the liquid incident to the discharge of said adsorbent material through said exhaust piping to said adsorbent material supply means; and communication means for communicating a spaced defined within said column between the top of said column and the uppermost surface level of said liquid with the atmosphere externally of said column.

* * * * *